(12) United States Patent
Louch et al.

(10) Patent No.: US 8,260,640 B2
(45) Date of Patent: Sep. 4, 2012

(54) SYSTEMS AND METHODS FOR PROVIDING CONTEXT-BASED MOVIE INFORMATION

(75) Inventors: John Louch, San Luis Obispo, CA (US); Todd Ditchendorf, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 243 days.

(21) Appl. No.: 12/631,437

(22) Filed: Dec. 4, 2009

(65) Prior Publication Data
US 2011/0137690 A1 Jun. 9, 2011

(51) Int. Cl.
G06Q 10/00 (2012.01)
G06Q 50/00 (2012.01)
(52) U.S. Cl. ............... 705/5; 705/1.1; 705/6; 705/7.16; 705/7.18; 705/7.24
(58) Field of Classification Search ............ 705/5–6, 705/1.1, 7.16, 7.18, 7.24
See application file for complete search history.

(56) References Cited

U.S. PATENT DOCUMENTS

| | | | |
|---|---|---|---|
| 6,816,778 B2 | 11/2004 | Diaz | |
| 7,657,449 B2 * | 2/2010 | Halavais et al. | 705/5 |
| 2003/0171973 A1 * | 9/2003 | Wilce et al. | 705/9 |
| 2005/0149399 A1 * | 7/2005 | Fukunaga et al. | 705/14 |
| 2006/0218027 A1 * | 9/2006 | Carrion | 705/8 |
| 2006/0237528 A1 * | 10/2006 | Bishop et al. | 235/380 |
| 2006/0293943 A1 * | 12/2006 | Tischhauser et al. | 705/9 |
| 2007/0233736 A1 * | 10/2007 | Xiong et al. | 707/104.1 |
| 2008/0021728 A1 * | 1/2008 | Khoo | 705/1 |
| 2008/0033779 A1 * | 2/2008 | Coffman et al. | 705/9 |
| 2008/0133282 A1 * | 6/2008 | Landar et al. | 705/5 |
| 2008/0162198 A1 * | 7/2008 | Jabbour et al. | 705/5 |
| 2008/0281665 A1 * | 11/2008 | Opaluch | 705/9 |
| 2009/0070708 A1 * | 3/2009 | Finkelstein | 715/789 |
| 2009/0156234 A1 * | 6/2009 | Sako et al. | 455/456.3 |
| 2009/0177513 A1 | 7/2009 | Eckhart et al. | |
| 2009/0204904 A1 | 8/2009 | Mujkic et al. | |
| 2009/0248537 A1 * | 10/2009 | Sarkeshik | 705/26 |
| 2010/0017245 A1 * | 1/2010 | Kristiansen et al. | 705/8 |
| 2010/0082376 A1 * | 4/2010 | Levitt | 705/7 |
| 2011/0126119 A1 * | 5/2011 | Young et al. | 715/744 |

FOREIGN PATENT DOCUMENTS
WO  WO 2006012629 A2 *  2/2006

OTHER PUBLICATIONS http://terrywhite.com/techblog/archives/3331.*
http://www.pcmag.com/article2/0,2817,2333290,00.asp.*
James Allen Johnson, "Flixster for Google Android. Find Movie Showtimes and Info on Your Mobile" Review of Flixster for Google Android, published Aug. 20, 2009, pp. 1-3.
Fandango Movie Showtimes & Tickets, http://www.apple.com/webapps/entertainment/fandangomovieshowtimestickets.html, posted Oct. 11, 2007, pp. 1-4.

* cited by examiner

Primary Examiner — Fadey Jabr
(74) Attorney, Agent, or Firm — Kramer Levin Naftalis & Frankel LLP

(57) ABSTRACT

Systems and methods are provided for generating context-based movie information. For example, a movie application on an electronic device can obtain show times of a movie from multiple movie theaters. In some embodiments, the movie application can combine one or more show times into a single time slot in order to condense the number of show times that are displayed. Furthermore, the movie application can provide slot labels corresponding to each time slot based on one or more context-sensitive factors (e.g., current time of day, current location, one or more upcoming calendar events, and the like). As a result, the movie application can provide a user with a condensed view of the most accessible show times based on current context.

14 Claims, 13 Drawing Sheets

SYSTEMS AND METHODS FOR PROVIDING CONTEXT-BASED MOVIE INFORMATION

FIELD OF THE INVENTION

This can relate to systems and methods for providing context-based movie information.

BACKGROUND OF THE DISCLOSURE

Today's electronic devices are able to integrate multiple functionalities. For example, electronic devices can allow users to both manage their personal information and access multiple services via the Internet. In some cases, users may be able to access a movie application for purchasing movie tickets. For instance, using a movie application, a user may specify his current location. Based on this information, the movie application can provide movie theaters that are located near the user's current location.

Current movie applications, however, are limited to providing only a few options for viewing ticketing information. For example, different users of a movie application may see a list of the same movie theaters regardless of current context. Moreover, users may need to browse through multiple theaters and multiple show times in order to find a suitable show time in terms of both time and location.

SUMMARY OF THE DISCLOSURE

Accordingly, systems and methods are provided for generating context-based movie information.

An electronic device can include a movie application that can obtain show times of one or more movie theaters. For example, the electronic device can obtain the show times from a data source (e.g., a server).

In some embodiments, if the number of show times that have been obtained exceeds a pre-determined threshold, the movie application can combine one or more show times in order to condense the number of show times that are displayed. For example, the movie application can obtain one or more time slots based on a set of time intervals (e.g., hourly time intervals). After obtaining the one or more time slots, the movie application can assign the one or more show times to a corresponding time slot.

The movie application can then generate slot labels corresponding to the time slots based on one or more factors. For example, the movie application can search for an assigned show time that is closest to a current time of day. In response to determining which assigned show time is closest to the current time of day, the movie application can determine a time slot that is associated with the assigned show time. Finally, the movie application can set a slot label of the time slot to the assigned show time. As another example, the movie application can obtain information associated with a calendar event. In response to obtaining the information, the movie application can determine if a time slot is associated with the calendar event. The movie application can then set a slot label of the time slot to an assigned show time of the time slot. Any suitable approach can be used for selecting an assigned show time such as, for example, spatial proximity (e.g., distance between a movie theater and the calendar event), temporal proximity (e.g., duration between the start time and/or end time of a calendar event and the start time and/or end time of a movie), current traffic conditions, and/or any combination thereof. Finally, the movie application can display the slot labels.

In some embodiments, based on information associated with one or more calendar events, the movie application can determine which time slots are unavailable for a particular day. In some cases, in response to determining the time slots that are unavailable, the movie application can provide one or more indications of those time slots. Thus, a user may easily view the available time slots without referring to a calendar. In some embodiments, in response to the user selecting an unavailable time slot, the movie application can provide an option for the user to view information associated with the one or more calendar events. In addition, the movie application can provide an option for the user to cancel the calendar event. In response to the user selecting an option to cancel the calendar event, the movie application can remove the indications of unavailable time slots.

In some embodiments, the movie application can determine whether a user has purchased movie tickets for a movie. In response to determining that the user has purchased the movie tickets, the movie application can provide options for transmitting information associated with the purchase to one or more other electronic devices.

In addition, the movie application can provide an indication that a user of another electronic device has purchased one or more tickets for a particular movie. In some cases, the movie application can also include options allowing the user to purchase additional tickets for the movie.

BRIEF DESCRIPTION OF THE DRAWINGS

The above and other aspects and advantages of the invention will be apparent upon consideration of the following detailed description, taken in conjunction with accompanying drawings, in which like reference characters refer to like parts throughout, and in which.

DETAILED DESCRIPTION OF THE DISCLOSURE

Systems, methods, and machine-readable media (e.g., computer-readable media) are disclosed for providing context-based movie information.

Figure 1:
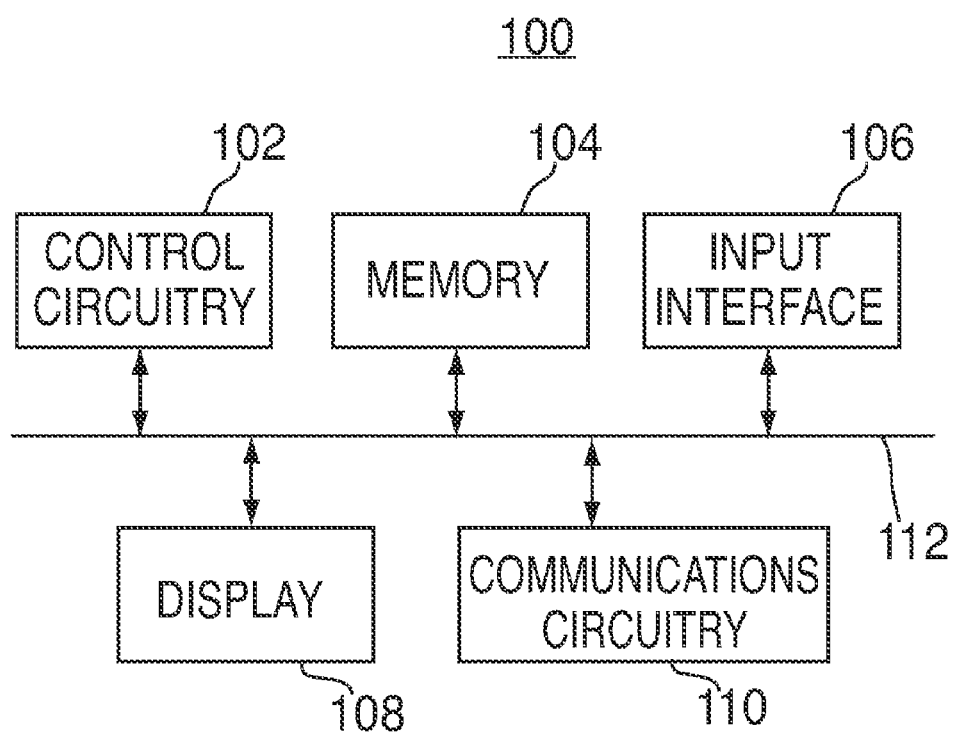
FIG. 1 shows a block diagram of an electronic device configured in accordance with various embodiments of the invention.

FIG. 1 is a schematic view of an illustrative electronic device 100 configured in accordance with various embodiments of the invention. Electronic device 100 can be any portable electronic device capable of executing a movie application. For example, electronic device 100 can include a portable media player (e.g., an iPod™, made available by Apple Inc. of Cupertino, Calif.), a cellular telephone (e.g., an iPhone™, made available by Apple Inc. of Cupertino, Calif.), a pocket-sized personal computer, a personal digital assistant (PDA), a desktop computer, a notebook computer, a tablet personal computer, or any combination thereof. Electronic device 100 can include control circuitry 102, memory 104, input interface 106, display 108, communications circuitry 110, and bus 112.

Persons skilled in the art will appreciate that while only one of each component is illustrated, electronic device 100 can include more than one of some or all of the components. Moreover, electronic device 100 can include other components not shown in FIG. 1. For example, electronic device 100 can include a power supply for providing power to the components of electronic device 100.

Control circuitry 102 can control the operation and various functions of electronic device 100. For example, as described in greater detail below, control circuitry 102 can direct display 108 to present show times and/or labels corresponding to time slots (e.g., slot labels) of a movie. As used herein, time slots may refer to groups of one or more show times, where each time slot can correspond to a certain time interval.

Control circuitry 102 can include any components, circuitry, or logic operative to drive the functionality of electronic device 100. For example, control circuitry 102 can include one or more processors acting under the control of an application (e.g., a movie application) and an operating system.

Memory 104 can include any suitable combination of non-volatile and volatile memories, such as cache memory, Flash memory, random access memory (RAM) (e.g., DDR RAM and/or SRAM), read only memory (ROM), a hard drive, an EPROM, EEPROM, or any combination thereof. In some embodiments, memory 104 can include a memory module specifically dedicated to storing firmware for control circuitry 102, such as for device applications (e.g., a movie application, operating system, user interface functions, and other processor functions).

In some embodiments, memory 104 may include memory modules operative to provide mass storage for electronic device 100. For example, memory 104 can be used by control circuitry 102 to store media files (e.g., audio or video files) or other types of electronic data (e.g., text-based files, pictures, graphics, and an address book of contacts). As another example, memory 104 can be used to store a calendar that includes one or more calendar events. In some embodiments, the calendar stored in memory 104 can be accessible to a movie application. The movie application can, for example, access the calendar in order to obtain one or more calendar events and/or to store one or more calendar events. As yet another example, memory 104 can store information or metadata associated with locally stored and remotely stored elements. Memory 104 can also store any other suitable information, such as preference information (e.g., movie theater preferences), lifestyle information, transaction information (e.g., credit card information), subscription information (e.g., for podcasts or television shows), and telephone information (e.g., an address book).

Input interface 106 and display 108 can provide a user interface for a user to interact with electronic device 100. Input interface 106 may enable a user to provide inputs and feedback to electronic device 100. Input interface 106 can take any of a variety of forms, such as one or more of a button, keypad (e.g., computer keyboard), dial, click wheel, touch screen, microphone, or accelerometer.

Display 108 can present visual media (e.g., graphics such as graphs, album covers, text and video) to the user. Display 108 can include, for example, a liquid crystal display (LCD), a touch screen display, or any other type of display. Electronic device 100 can also include any other suitable type of output component in addition to or instead of display 108, such as, for example, audio outputs and/or haptic outputs (e.g., vibrational outputs).

Electronic device 100 can include communications circuitry 110 for communicating with one or more data sources (e.g., another electronic device and/or a server). For example, communications circuitry 110 can obtain information associated with movies from a data source. For instance, communications circuitry 110 can obtain movie data (e.g., actor information, movie summaries, movie ratings, etc.), show times of movie theaters, movie trailers, and the like. As another example, communications circuitry 110 can transmit and/or receive information associated with movie ticket purchases between electronic device 100 and one or more other electronic devices.

Communications circuitry 110 can include Wi-Fi enabling circuitry that permits wireless communications according to one of the 802.11 standards or a private network. Other wired or wireless protocol standards, such as Bluetooth™, can be used in addition or instead.

Bus 112 may provide a data transfer path for transferring data to, from, or between control circuitry 102, memory 104, input interface 106, display 108, communications circuitry 110, and some or all of the other components of electronic device 100.

In some embodiments, control circuitry 102 of electronic device 100 can execute a movie application for providing context-based movie information. For example, the movie application can obtain show times of multiple movie theaters. For instance, the electronic device can obtain the show times from a data source (e.g., a server). In some cases, the movie application can combine one or more show times in order to condense the number of show times that are displayed.

As another example, the movie application can obtain information associated with one or more calendar events. Based on the information, the movie application can then determine which show times are unavailable (e.g., show times that conflict with the one or more calendar events). In some embodiments, the movie application can provide one or more indications of these show times. As a result, the user may easily determine which show times are available for a particular day.

As yet another example, the movie application can determine whether a user has purchased one or more movie tickets. In response to determining that the user has purchased movie tickets, the movie application can provide one or more options for transmitting information associated with the purchase to one or more sources. The one or more sources can include, for example, one or more other electronic devices, one or more online sources such as online networking websites, Internet search engines, and the like.

In some embodiments, a user can launch the movie application by selecting a movie application option using input interface 106 on electronic device 100. For example, the movie application can be represented as an icon on a home screen of an electronic device (e.g., an electronic device with a touch screen). The user may thus select the movie application by touching the icon. In response to the user selecting the icon, the electronic device can present a display screen associated with the movie application. In some embodiments, the electronic device can load the movie application from memory 104. In other embodiments, communications circuitry 110 can partially load the movie application from a remote source (e.g., a data server).

Figure 2:
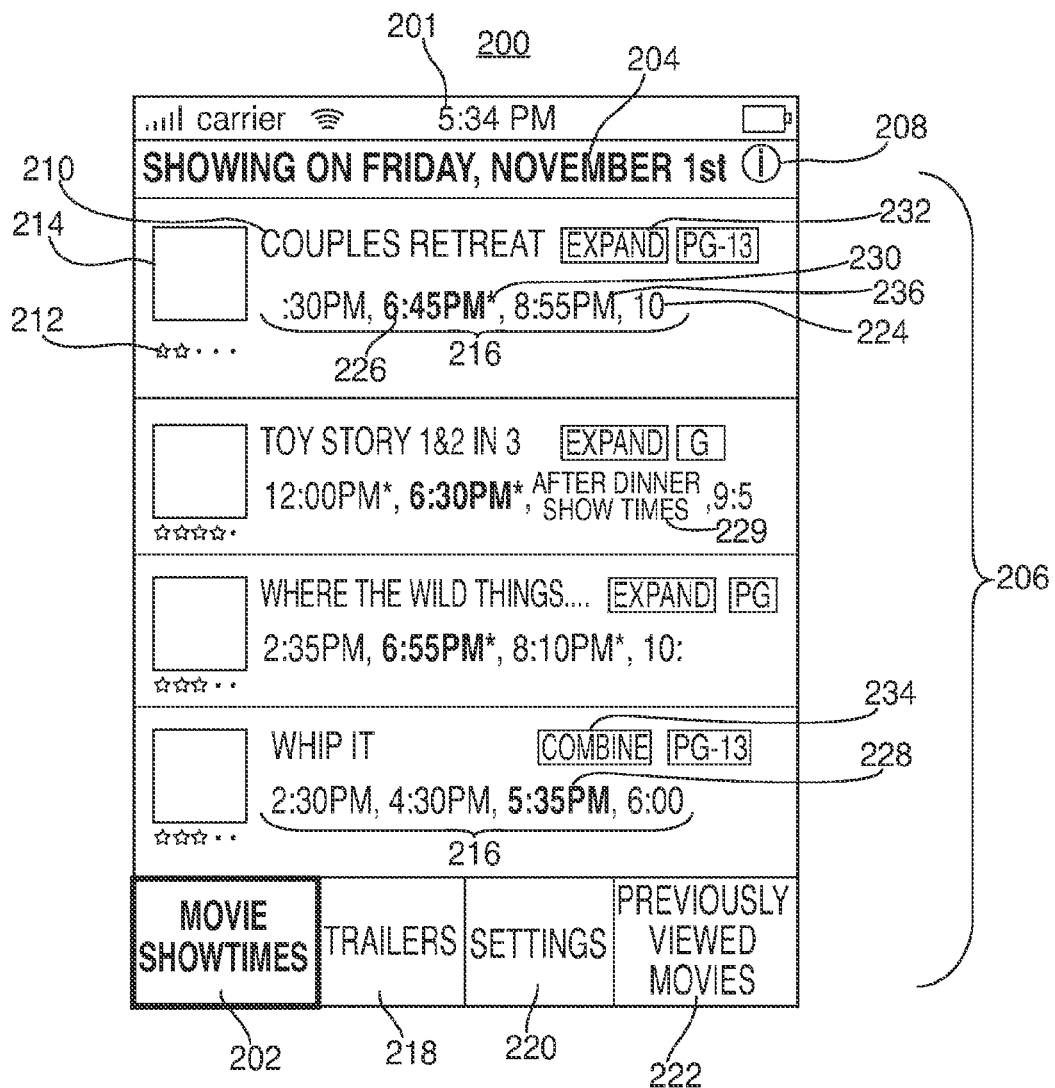
FIG. 2 shows a display screen associated with a "MOVIE SHOWTIMES" option of a movie application in accordance with various embodiments of the invention.

FIG. 2 shows a display screen 200 associated with a "MOVIE SHOWTIMES" option 202 of the movie application, which can be provided by various embodiments of the electronic device. Display screen 200 can include date information 204, which can provide a user with an indication of the date associated with movies provided in a list of movie information 206. For example, as shown in FIG. 2, the movie application is currently providing information for movies that are being shown on "Friday, November 1st".

In some embodiments, the user may select to change the date by selecting "INFORMATION" option 208. For example, in response to receiving an instruction from the user to change to a new date, the movie application can obtain movie information that corresponds to the new date. The movie application can then provide the movie information in list of movie information 206.

List of movie information 206 can include any suitable information associated with one or more movies including, for example, movie titles 210, movie ratings 212, one or more images 214 associated with the movies (e.g., movie posters), list of show times 216 associated with the movies, any other suitable information, and/or any combination thereof. Persons skilled in the art will appreciate that these are merely illustrative examples of information associated with movies and that list of movie information 206 can include any suitable movie information.

The movie application can provide additional information associated with a movie in response to receiving one or more instructions. For example, in response to a user selecting movie title 210, movie rating 212 and/or image 214, the movie application can provide additional detailed information associated with the movie (e.g., release date, duration, cast, genre, summary, and the like). In some embodiments, the movie application can provide an option allowing the user to purchase one or more movie tickets.

In some cases, in addition to being associated with a particular date, list of movie information 206 can also be associated with one or more other factors. For example, list of movie information 206 can be customized for one or more locations (e.g., movie theaters in a particular city and/or a town). In some embodiments, the user may select "INFORMATION" option 208 to select one or more locations (e.g., by adding a location and/or deleting a pre-existing location). For example, the user may select a location by providing a zip code and/or an address (e.g., town and state). In response to receiving an instruction selecting one or more locations, the movie application can search for movie theaters that are in these locations (e.g., the movie application can search one or more servers for movie theater locations). The movie application can then update list of movie information 206 with information of movie theaters from the customized locations.

In other embodiments, the movie application can determine one or more locations by obtaining the current location of the electronic device. For example, the electronic device can use positioning circuitry (e.g., a global positioning system receiver) that can apply a triangulation or trilateration technique to estimate the current geographic location of the electronic device. Based on the current location of the electronic device, the movie application can provide information of movie theaters that are located within a pre-determined proximity (e.g., 5 miles) of the current location.

In further embodiments, list of movie information 206 can include movie information from one or more movie theaters that have been specified by a user. For example, the user may select "INFORMATION" option 208 to specify one or more favorite movie theaters. For instance, the user may search for a movie theater by providing a zip code, an address (e.g., a city and state), and/or a theater name. In response to the user selecting one or more favorite movie theaters, the movie application can provide only information of the user-selected movie theaters.

Display screen 200 can include "TRAILERS" option 218, "SETTINGS" option 220, and "PREVIOUSLY VIEWED" option 222. In some embodiments, the movie application can change the display screen in response to receiving a selection of one of "MOVIE SHOWTIMES" option 202, "TRAILERS" option 218, "SETTINGS" option 220, and "PREVIOUSLY VIEWED" option 222. For example, in response to the user selecting "TRAILERS" option 218, the movie application can provide a display screen allowing the user to view movie trailers.

As another example, in response to the user selecting "PREVIOUSLY VIEWED" option 222, the user may view rating information associated with one or more previously viewed movies. For instance, the movie application can allow the user to view ratings and/or comments from one or more sources (e.g., online sources or other users). In some embodiments, the user may select to only view ratings and/or comments from certain users. For example, if a user watched a movie with several friends, the user may select to view only information provided by these friends. In some embodiments, the movie application can allow the user to provide ratings and/or comments for one or more movies (e.g., a movie that the user has recently watched). If, for a particular movie, the user has selected to share information with only certain users, the movie application can share the user's ratings and comments with only these users.

As yet another example, in response to the user selecting "SETTINGS" option 220, the movie application can provide a display screen allowing the user to change one or more settings of the movie application. Options for changing one or more settings of the movie application will be further described in connection with FIG. 8.

List of show times 216 can include show times of multiple movie theaters. For example, the movie application can receive show times of a movie from one or more data sources (e.g., one or more servers). In some embodiments, the movie application can provide all of the received show times in list of show times 216. In addition, the movie application can display the movie theater corresponding to each show time in list of show times 216. For example, the movie application can provide a list of movie theaters (not shown in display screen 200), where each movie theater in the list can be associated with a unique color. The movie application can then color code the show times in list of show times 216 to match the color of the corresponding movie theater. As a result, show times from a particular movie theater would be displayed with the same color. It will be understood that this is merely an illustrative example. Thus, the movie application can provide any suitable indication to distinguish show times from different movie theaters.

In some embodiments, the movie application can provide an indication of past show times. The movie application can, for instance, gray out a show time or cross out a show time indicating that the show time is no longer available. In other embodiments, the movie application can provide only the upcoming show times. For example, the movie application can obtain a current time of day. After obtaining the current time of day, the movie application can display only those show times that are after the current time of day.

The movie application can organize the show times in list of show times 216 using any suitable approach. For example, the movie application can organize the show times based on the chronological order of the show times (e.g., the most recent show time can be provided first). As another example, the movie application can organize the show times based on both the chronological order of the show times and the locations of the movie theaters corresponding to the show times. For instance, the movie application can obtain a current time of day and the current location of the electronic device. The movie application can then attempt to sort show times by ranking show times based on both temporal proximity (e.g., the difference between a show time and current time 201) and spatial proximity (e.g., the distance between the location of a show time and the user's current location). For example, show times that are both closer to the current time and correspond to locations that are closer to the user's current location may be provided before other show times.

In some embodiments, the movie application can rank show times based on the estimated ability of a user to arrive at a location on time. For example, show times that are further away from the current time but are in closer proximity to the current location may be listed before show times that are closer but are further away in proximity, and vice versa. Thus, the movie application can use spatial proximity and/or temporal proximity to increase or decrease the ranking of one or more show times.

In some embodiments, the movie application can provide only a pre-determined number of show times (e.g., three show times) in list of show times 216. In some cases, the movie application can provide an indication of show times that are not fully or currently displayed in list of show times 216. The movie application can use any suitable indication such as, for example, ellipses, arrows, fade-out text, partial text, any other suitable indication, and/or any combination thereof. For example, as shown in display screen 200, partial text 224 can provide an indication that there are one or more show times that are not fully or currently being displayed.

In some embodiments, list of show times 216 can be scrollable. Thus, to view additional show times, a user may flick list of show times 216 to the left or right on a touch screen of the electronic device (e.g., input interface 106 of FIG. 1). For example, as shown in display screen 200, in response to receiving a left flicking motion over list of show times 216 for the movie "Couples Retreat", the movie application can provide additional show times following the 8:55 pm showing (e.g., while maintaining the remainder of display screen 200 as shown in FIG. 2).

In some embodiments, the movie application can attempt to combine one or more show times in order to condense the number of show times displayed in list of show times 216. For example, for a particular movie, the movie application can determine the number of show times received from all movie theaters. In some embodiments, the show times can be received from only movie theaters that meet the criteria of a specific search (e.g., all theaters that are within 5 miles of the current location of the electronic device). In response to determining that the number exceeds a pre-determined threshold (e.g., 10 show times), the movie application can attempt to combine one or more show times into one or more time slots.

The movie application can create the one or more time slots based on a set of time intervals. In some embodiments, a user may specify the set of time intervals by selecting "INFORMATION" option 208. For example, the user may specify a set of time intervals corresponding to each hour of a day. Thus, each time slot can correspond to a different hour in a day and can be associated with a different start time and end time. For instance, a time slot can have a start time of 6:00 pm and an end time of 7:00 pm. As another example, the user may specify a set of time intervals corresponding to every two hours of a day. As yet another example, the movie application can obtain time slots for only certain time intervals (e.g., time slots can be obtained from 6:00 pm to 12:00 am). Persons skilled in the art will appreciate that these examples are merely illustrative and that the time slots can correspond to any suitable set of time intervals.

In some embodiments, the movie application can provide options for adjusting a time slot to any suitable duration. For example, a user may select "INFORMATION" option 208 to adjust the time slots to a new set of time intervals. For instance, the user may select to shift the time slots by a pre-determined period of time (e.g., shift each time slot by 15 minutes). Thus, in response to receiving an instruction to adjust the time slots to a new set of time intervals, the movie application can adjust the time slots based on the new set of time intervals. The movie application can then re-assign show times to the adjusted time slots. As a result, instead of starting and ending on the hour, a time slot can have a start time of 5:45 pm and end time of 6:45 pm. As another example, the user may adjust the time slots such that the duration of each time slot varies depending on the time of day. For instance, time slots corresponding to the morning and early afternoon may have a longer duration (e.g., three hours) as compared with time slots corresponding to the later afternoon and evening hours (e.g., one hour).

In response to obtaining one or more time slots, the movie application can assign show times from multiple movie theaters to the one or more time slots. In some cases, after assigning the show times, the movie application can remove time slots that have no assigned show times.

Based on the assigned show times, the movie application can generate a slot label corresponding to each time slot. The movie application can generate slot labels of time slots using any suitable approach. In some embodiments, the movie application can determine if a time slot includes only one assigned show time. In response to determining that the time slot includes only one assigned show time, the movie application can set the slot label of the time slot to the assigned show time. For example, if a time slot only includes a 2:30 pm showing, the movie application can set a slot label of the time slot to 2:30 pm.

In other embodiments, the movie application can set a slot label of a time slot based on a time associated with the time slot. For example, if a time slot is associated with a particular time interval, the movie application can set the slot label to a start time of the time interval, an end time of the time interval, a time between the start time and the end time of the time interval, or any other suitable time in the duration of the time interval.

In further embodiments, the movie application can set a slot label of a time slot based on the current context. For example, the movie application can set the slot label based on temporal proximity. For instance, the movie application can determine a current time of day. After determining the current time of day, the movie application can search for a current time slot associated with an assigned show time that is closest to the current time of day. In response to determining the current time slot, the movie application can set a slot label of the current time slot to the assigned show time. In some embodiments, the movie application can only search for assigned show times that are after the current time of day.

As another example, in addition to or instead of setting the slot label of the current time slot based on temporal proximity, the movie application can set the slot label based on spatial proximity. For instance, the movie application can determine the current location of the electronic device. After determining the current location, the movie application can determine movie theaters associated with assigned show times of the current time slot. The movie application can then obtain the movie theater locations. Based on the theater locations, the movie application can determine a theater location that is closest to the current location of the electronic device. Finally, the movie application can set the slot label of the current time slot to the assigned show time of the movie theater that is closest to the current location.

In some embodiments, if the assigned show time determined based on temporal proximity is different from the assigned show time determined based on spatial proximity (e.g., the closest upcoming show time is not being shown at a movie theater closest to the current location), the movie application can set the slot label based on a weighted average of the temporal and spatial proximities. Thus, the movie application can determine an assigned show time that is most suitable given the current user context. Persons skilled in the art will appreciate that in addition to or instead of temporal and/or spatial proximities, the movie application can determine a suitable assigned show time based on one or more other factors of a current user's context. For example, the movie application can determine an assigned show time based on current traffic conditions.

In addition to using current context, persons skilled in the art will appreciate that the movie application can determine a slot label of a time slot based on future context. For example, if a time slot is 6 hours from the current time, the movie application can determine a future context corresponding to the time slot (e.g., based on the location of one or more calendar events that are scheduled to occur near or during the time slot).

After setting the slot label of the current time slot to an assigned show time, the movie application can provide the slot label in list of show times 216. In some cases, the movie application can additionally perform one or more actions in order to differentiate the slot label of the current time slot from other slot labels in list of show times 216.

For example, the movie application can determine if list of show times 216 includes at least three slot labels. In response to determining that list of show times 216 includes at least three slot labels, the movie application can arrange the slot labels such that the slot label of the current time slot is centrally positioned. For instance, as shown in display screen 200, the movie application can arrange the slot labels such that slot label 226 of the current time slot (e.g., 6:45 pm) is centrally displayed in list of show times 216.

As another example, the movie application can determine if list of show times 216 includes at least two slot labels. In response to determining that list of show times 216 includes at least two slot labels, the movie application can arrange the slot labels such that the slot label of the current time slot is positioned first in list of show times 216.

As yet another example, the movie application can differentiate the slot label of the current time slot by highlighting the slot label. For example, as shown in display screen 200 of FIG. 2, slot label 226 is highlighted. Persons skilled in the art will appreciate that although the previous discussion refers to slot labels, the movie application can similarly differentiate a show time in list of show times 216 that is temporally and/or spatially proximate to the current time and/or the current location.

In yet further embodiments, the movie application can set a slot label of a time slot based on an assigned show time and one or more calendar events. For example, the movie application can determine if a time slot includes multiple assigned show times. In response to determining that the time slot includes multiple assigned show times, the movie application can determine if the time slot is associated with a calendar event. For example, the movie application can obtain information associated with one or more calendar events from a calendar accessible by the device (e.g., stored in memory 104 or accessible by communications circuitry 110 of FIG. 1). The information associated with a calendar event can include any suitable information such as, for example, a start time, an end time, a duration, a location, one or more participants, any other suitable information, and/or any combination thereof.

The movie application can determine if the time slot is associated with the calendar event by, for example, determining if a time associated with the time slot is within a pre-determined range (e.g., 30 minutes) of a start time or an end time of the calendar event. The time associated with the time slot can be any suitable time such as, for example, a start time associated with the time slot, an end time associated with the time slot, an assigned show time of the time slot, an end time of the movie associated with an assigned show time, or any other suitable time. For example, the movie application can determine that the time slot is associated with the calendar event if the end time of the time slot or an end time of the movie is within 30 minutes of the start time of the calendar event. As another example, the movie application can determine that the time slot is associated with the calendar event if the start time of the time slot or an assigned show time is within 30 minutes of the end time of the calendar event.

The movie application can determine the pre-determined range using any suitable approach. For example, the user may specify the pre-determined range by selection "INFORMATION" option 208. As another example, the movie application can automatically determine the pre-determined range based on one or more factors. For instance, the movie application can determine the pre-determined range based on the location of one or more movie theaters, the current location of the electronic device, the location of the calendar event, and/or any combination thereof. In one implementation, the movie application can calculate the pre-determined range by estimating the travel time between a movie theater and the location associated with the calendar event.

In response to determining that a time slot is associated with the calendar event, the movie application can set the slot label of the time slot to one of the assigned show times of the time slot. In some embodiments, the movie application can determine an assigned show time based on spatial proximity. For example, the movie application can determine movie theaters associated with assigned show times of the time slot. The movie application can then obtain the theater locations. After obtaining the theater locations, the movie application can determine the theater location that is closest to the location of the calendar event. Finally, the movie application can set the slot label of the time slot to the assigned show time of the closest movie theater.

After generating the slot labels, the movie application can provide the slot labels in list of show times 216. Thus, by generating slot labels based on one or more calendar events, the movie application can allow a user to quickly determine the most accessible show time based on one or more upcoming events. As discussed previously, in addition to or instead of using spatial proximity to determine the most suitable slot label, the movie application can also use temporal proximity to determine which assigned show time to use for the slot label.

Persons skilled in the art will appreciate that instead of assigned show times, the movie application can generate any suitable slot label for a time slot. For example, the movie application can generate a slot label corresponding to the time interval of a time slot (e.g., "5:00 pm-6:00 pm"). As another example, the movie application can generate a slot label that includes a description corresponding to the time slot. The description may be associated with one or more assigned show times of the time slot and/or one or more calendar events associated with the time slot. For instance, as shown in display screen 200, slot label 229 may provide an indication that a particular time slot corresponds to "after dinner show times."

In some embodiments, in response to determining that a time slot includes multiple assigned show times, the movie application can provide an indication 230 in list of show times 216. The indication can be any suitable indication including, for example, an asterisk, a pre-determined color, an animated visual effect, any other suitable indication, and/or any combination thereof.

Moreover, if list of show times 216 of a movie includes one or more slot labels, the movie application can provide an "EXPAND" option 232 for expanding list of show times 216. Thus, in response to a user selecting "EXPAND" option 232, the movie application can provide all show times that had previously been assigned to different time slots. In some embodiments, if show times are displayed in list of show times 216, the movie application can provide a "COMBINE" option 234 for combining show times in list of show times 216. Thus, in response to a user selecting "COMBINE" option 234, the movie application can combine one or more of the show times in list of show times 216 into one or more time slots. The user may then view slot labels of the one or more time slots in list of show times 216. Persons skilled in the art will appreciate that a list of show times 216 for a movie can include a combination of show times and slot labels. Thus, in some embodiments, in response to the user selecting "EXPAND" option 232, the movie application can provide show times that were previously assigned to one or more time slots, while continuing to display show times that were not assigned to time slots. Similarly, in response to the user selecting "COMBINE" option 234, the movie application can combine a subset of show times to one or more time slots.

A user may select a slot label or a show time in list of show times 216 in order to obtain additional information. For example, in response to the user selecting a show time (e.g., show time 228) in list of show times 216, the movie application can determine the movie theater corresponding to the show time. The movie application can then provide information associated with the movie theater to the user. The movie application can provide any suitable information including, for instance, the theater name, the theater location (e.g., a map of the theater location), and/or any other suitable theater information. In addition, the movie application can provide an option for allowing the user to purchase one or more tickets at the specified show time.

Figure 3:
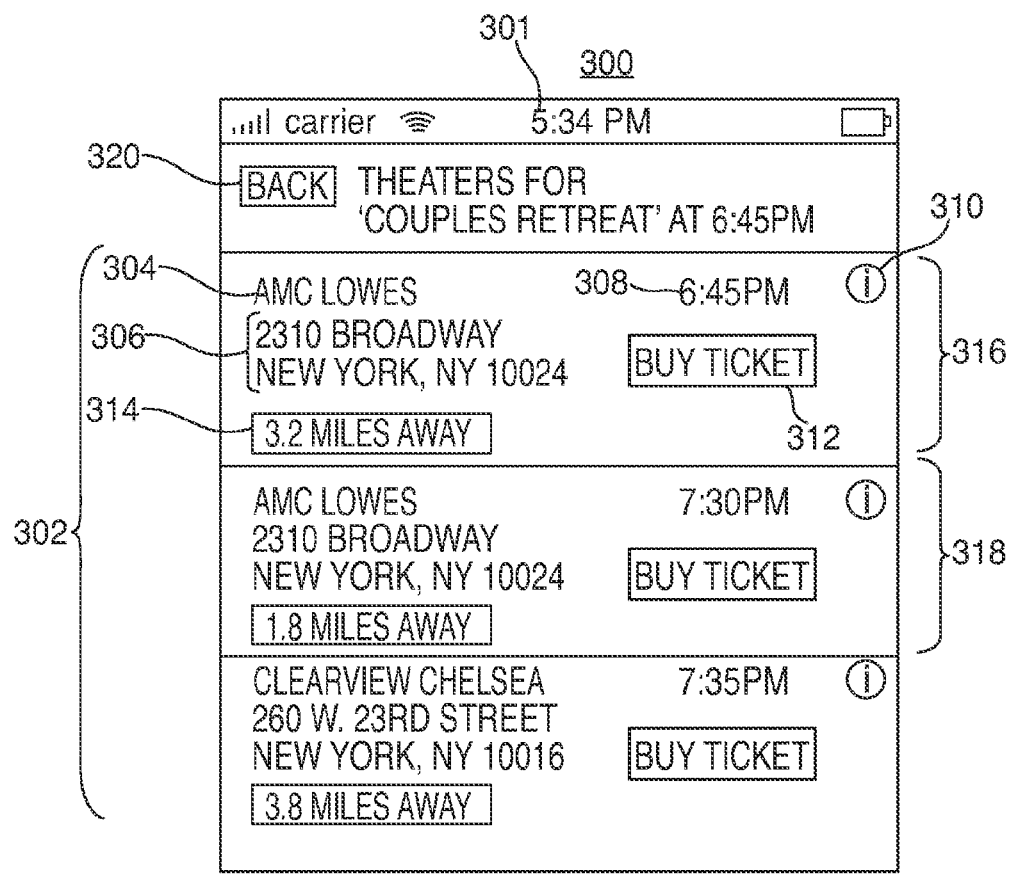
FIG. 3 shows a display screen for providing information associated with a movie corresponding to a first time slot of a movie application in accordance with various embodiments of the invention.

As another example, in response to the user selecting slot label 226 in list of show times 216, the movie application can present a display screen of a time slot associated with slot label 226. For instance, FIG. 3 shows a display screen 300 of a time slot associated with slot label 226. Display screen 300 can include list of movie theaters 302 providing one or more movie theaters with show times assigned to a time slot corresponding to slot label 226. List of movie theaters 302 can include any suitable information associated with a movie theater including, for example, theater name 304, theater location 306, show time 308, theater information 310, any other suitable information, or any combination thereof. In some embodiments, the user may select theater information 310 in order to view detailed information associated with a movie theater.

Each movie theater in list of movie theaters 302 can include "BUY TICKET" option 312 allowing a user to purchase one or more movie tickets. In addition, each movie theater in list of movie theaters 302 can include option 314 that may provide the distance (e.g., number of miles) between the user's current location (e.g., the location of the electronic device) and the location of the movie theater. In some embodiments, the user may select option 314 to obtain directions to the movie theater from the user's current location.

The movie theaters in list of movie theaters 302 can be arranged based on one or more factors discussed in connection with FIG. 2 (e.g., temporal proximity, spatial proximity, and/or current traffic conditions). For example, as shown in display screen 300, although movie theater 316 may be located further away from the user's current location in comparison with the location of movie theater 318 (e.g., 3.2 miles as compared to 1.8 miles), the show time of movie theater 316 may be closer to the current time (e.g., 5:34 pm as shown by current time element 301) in comparison with the show time of movie theater 318 (e.g., 6:45 pm as compared to 7:30 pm). If the movie application determines that the additional distance for traveling to movie theater 316 may be compensated by the earlier show time, the movie application can assign a higher ranking to movie theater 316 in list of movie theaters 302.

From display screen 300, the user may choose to return to viewing time slots and/or show times for all movies. The user may, for example, select "BACK" option 320 in display screen 300. The movie application can then return to presenting display screen 200 of FIG. 2.

Returning back to display screen 200 (FIG. 2), the user may select slot label 236. In response to the user selecting slot label 236 in list of show times 216, the movie application can present a display screen of a time slot associated with slot label 236.

Figure 4:
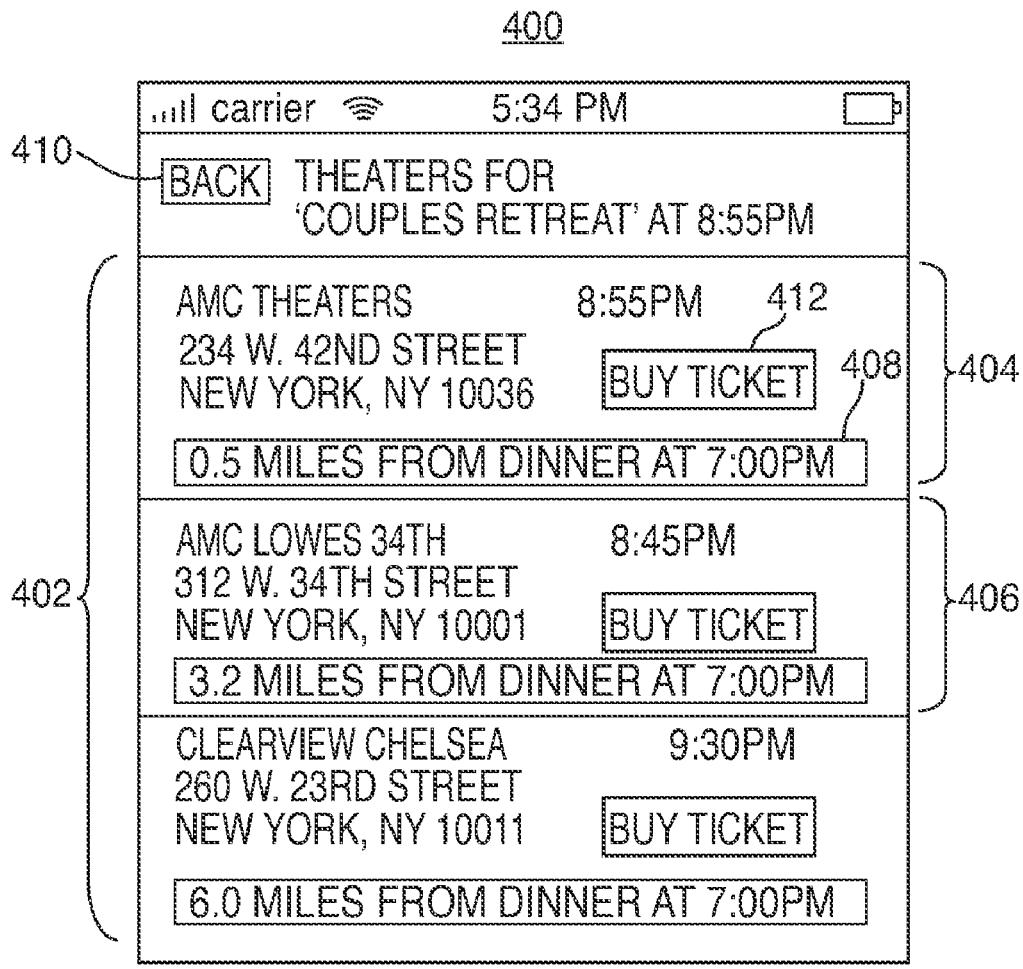
FIG. 4 shows a display screen for providing information associated with a movie corresponding to a second time slot of a movie application in accordance with various embodiments of the invention.

For example, FIG. 4 shows a display screen 400 of a time slot associated with slot label 236. Display screen 400 can include list of movie theaters 402 providing one or more movie theaters with show times assigned to a time slot corresponding to slot label 236. As discussed in connection with FIG. 2, the movie application can determine that the time slot corresponding to slot label 236 is associated with a calendar event (e.g., "dinner" with a start time of 7:00 pm and an end time of 8:30 pm). For instance, the movie application can determine that the time slot is associated with the calendar event because one or more of the show times assigned to the time slot are within a pre-determined range (e.g., 30 minutes) of the end time of the dinner.

Similar to FIG. 3, the movie theaters in list of movie theaters 402 can be arranged based on one or more factors (e.g., temporal proximity and/or spatial proximity). For example, as shown in display screen 400, although the show time of movie theater 404 is further from the end time of the dinner as compared to the show time of movie theater 406 (e.g., 8:55 pm as compared to 8:45 pm), the movie application can determine that movie theater 404 is located closer to dinner than movie theater 406 (e.g., 0.5 miles as compared to 3.2 miles). Thus, the movie application can assign a higher ranking to movie theater 404 because the later show time of movie theater 404 can be compensated by the shorter distance.

Display screen 400 can include option 408 that may provide the number of miles between the location of a calendar event (e.g., the location of dinner) and the location of the movie theater. In some embodiments, a user may select option 408 to obtain directions to the movie theater from the calendar event, or vice versa.

From display screen 400, the user may choose to return to viewing time slots and/or show times for all movies. The user may, for example, select "BACK" option 410 in display screen 400. The movie application can then return to presenting display screen 200 of FIG. 2.

The movie application can update the slot labels or show times displayed in list of show times 216 of FIG. 2 at pre-determined periods (e.g., every 30 minutes). Persons skilled in the art will appreciate that the pre-determined periods can be selected using any suitable approach. The pre-determined periods can be, for example, selected by a user and/or automatically selected by the movie application. In some embodiments, the pre-determined periods can correspond to one or more time slots. Thus, for instance, the movie application can update the slot labels in response to determining that a time slot has ended.

In some embodiments, after a pre-determined period has elapsed, the movie application can determine the current time of day. Then, as previously discussed in connection with FIG. 2, the movie application can determine a new time slot corresponding to the current time of day (e.g., based on temporal proximity, spatial proximity, and/or current traffic conditions). In addition, the movie application can determine a slot label of the new time slot. For example, the movie application can set a slot label to an assigned show time. As another example, the movie application can generate a slot label based on any other suitable information (e.g., the time interval of the new time slot). As yet another example, the movie application can generate a slot label that includes a description corresponding to the new time slot. For instance, the description may be associated with one or more assigned show times of the time slot and/or one or more calendar events associated with the time slot.

After determining the new time slot and the slot label corresponding to the new time slot, the movie application can update the slot labels in list of show times 216. For example, the movie application can re-arrange the slot labels such that the slot label of the new time slot is centrally positioned and/or highlighted on a display (e.g., display 108 of FIG. 1). Thus, in some cases, the movie application can shift the slot labels in list of show times 216 to the left. Persons skilled in the art will appreciate that the movie application can similarly update and re-arrange one or more show times in a list of show times.

Figure 5:
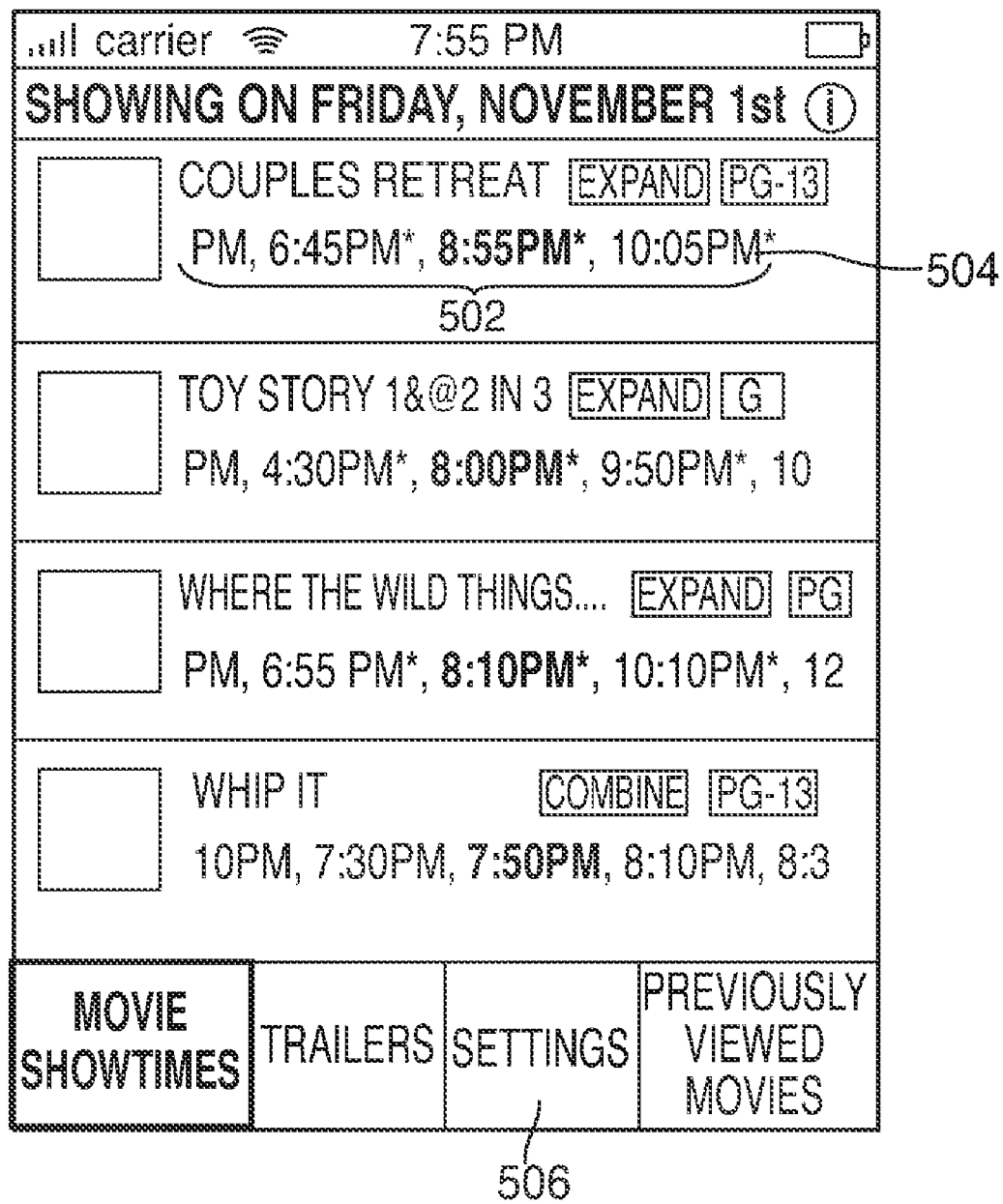
FIG. 5 shows a display screen associated with a "MOVIE SHOWTIMES" option of a movie application, similar to FIG. 2, in accordance with various embodiments of the invention.

For example, FIG. 5 shows a display screen 500 associated with updated lists of show times. For example, a list of show times 502 can include updated slot labels corresponding to a current time of day (e.g., 7:55 pm). A user may select a slot label or a show time in list of show times 502 in order to obtain more information associated with the slot label or the show time. Thus, in response to the user selecting slot label 504 in list of show times 502, the movie application can present a display screen of a time slot associated with slot label 504.

Figure 6:
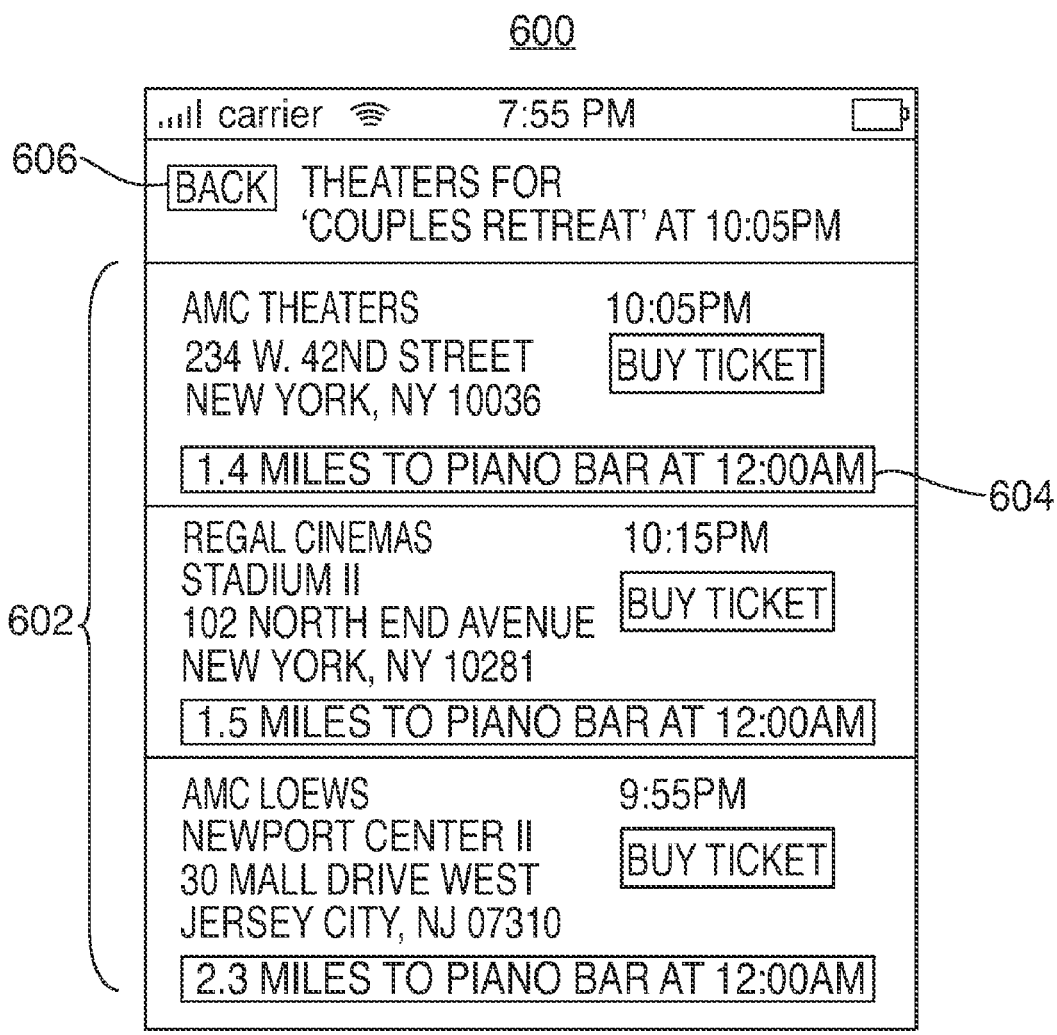
FIG. 6 shows a display screen for providing information associated with a movie corresponding to a third time slot of a movie application in accordance with various embodiments of the invention.

For example, FIG. 6 shows a display screen 600 of a time slot associated with slot label 504. Display screen 600 can include list of movie theaters 602 providing one or more movie theaters with show times assigned to a time slot corresponding to slot label 504.

The movie theaters in list of movie theaters 602 can be arranged based on one or more factors discussed in connection with FIGS. 2-4 (e.g., temporal proximity and/or spatial proximity). For example, the movie application can determine that the time slot corresponding to slot label 504 is associated with a calendar event (e.g., "piano bar" with a start time of 12:00 am). In some embodiments, the movie application can determine that the time slot is associated with the calendar event based on an end time of the movie and the start time of the calendar event.

For example, the movie application can determine an end time of the movie corresponding to each assigned show time of the time slot. After determining the end times, the movie application can determine if one or more end times are within a pre-determined range (e.g., 30 minutes) of the start time of the piano bar engagement (e.g., 12:00 am). For instance, the movie application can determine that the end time of the movie corresponding to a show time of 10:05 pm is 11:45 pm. As a result, the movie application can determine that the time slot is associated with the calendar event because the end time is within 30 minutes of the start time of the piano bar engagement. Similar to FIGS. 3 and 4, instead of or in addition to temporal proximity, the movie theaters in list of movie theaters 602 can be arranged based on spatial proximity.

Display screen 600 can include option 604 that may provide the number of miles between a calendar event (e.g., the location of the piano bar) and the location of a movie theater. In some embodiments, a user may select option 604 to obtain directions from the calendar event to the movie theater, or vice versa.

From display screen 600, the user may choose to return to viewing time slots and/or show times for all movies. The user may, for example, select "BACK" option 606 in display screen 600. The movie application can then return to presenting display screen 500 of FIG. 5.

Figure 7:
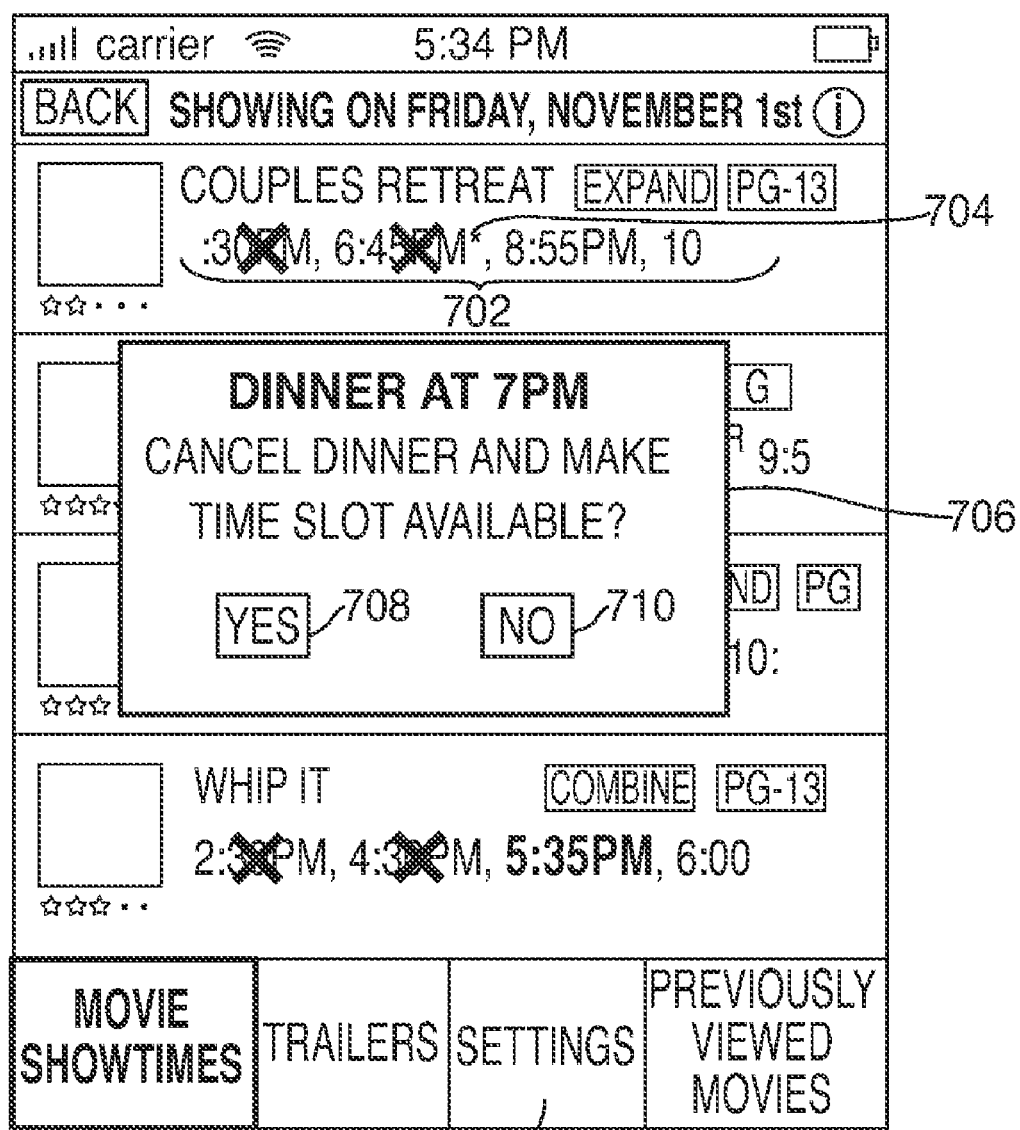
FIG. 7 shows a display screen associated with a "MOVIE SHOWTIMES" option of a movie application, similar to FIGS. 2 and 5, in accordance with various embodiments of the invention.

In some embodiments, in addition to displaying time slots and/or show times for all movies, the movie application can display one or more indications of time slots and/or show times that are unavailable. For example, FIG. 7 shows a display screen 700 associated with a "MOVIE SHOWTIMES" option of a movie application, which can be provided by various embodiments of the electronic device.

Display screen 700 can include list of show times 702 with one or more indications of unavailable slot labels. For example, the unavailable slot labels can correspond to time slots that have already passed. As another example, the unavailable slot labels can correspond to time slots that conflict with one or more calendar events. The movie application can, for instance, determine if a portion of a time period associated with a time slot overlaps with a time period of a calendar event. In response to determining that a portion of the time period overlaps with the time period of the calendar event, the movie application can display an indication that the time slot is unavailable.

The movie application can provide the one or more indications using any suitable approach. For example, the movie application can gray out slot labels that are unavailable. As another example, as shown in display screen 700, the movie application can cross-out slot labels that are unavailable.

In some embodiments, in response to the user selecting an unavailable slot label, the movie application can perform one or more actions. For example, in response to the user selecting a slot label (e.g., slot label 704) associated with a time slot that conflicts with a calendar event, the movie application can provide message 706. In some embodiments, message 706 can provide information associated with the conflicting calendar event. In other embodiments, message 706 can provide information associated with all calendar events for the day. In further embodiments, in response to the user selecting a slot label, the movie application can provide a full or partial view of a calendar.

Message 706 can include "YES" option 708 and "NO" option 710. For example, the user may select "YES" option 708 to cancel the calendar event. Thus, in response to the user selecting "YES" option 708, the movie application can remove one or more indications of time slots that were previously unavailable. The user may thus access the assigned show times of the time slot. In some embodiments, in response to the user selecting "YES" option 708, the movie application can remove the calendar event from the user's calendar. If, on the other hand, the user selects "NO" option 710, the movie application can remove message 706 from display screen 700. Persons skilled in the art will appreciate that although display screen 700 is discussed in connection with unavailable slot labels, the movie application can similarly display one or more indications of unavailable show times (e.g., show times that have passed or show times that conflict with one or more calendar events).

In some embodiments, from display screen 200 of FIG. 2, display screen 500 of FIG. 5, or display screen 700 of FIG. 7, a user may select a "SETTINGS" option (e.g., "SETTINGS" option 220 of FIG. 2, "SETTINGS" option 506 of FIG. 5, or "SETTINGS" option 712 of FIG. 7). In response to the user selecting a "SETTINGS" option, the movie application can then present a display screen associated with the "SETTINGS" option.

Figure 8:
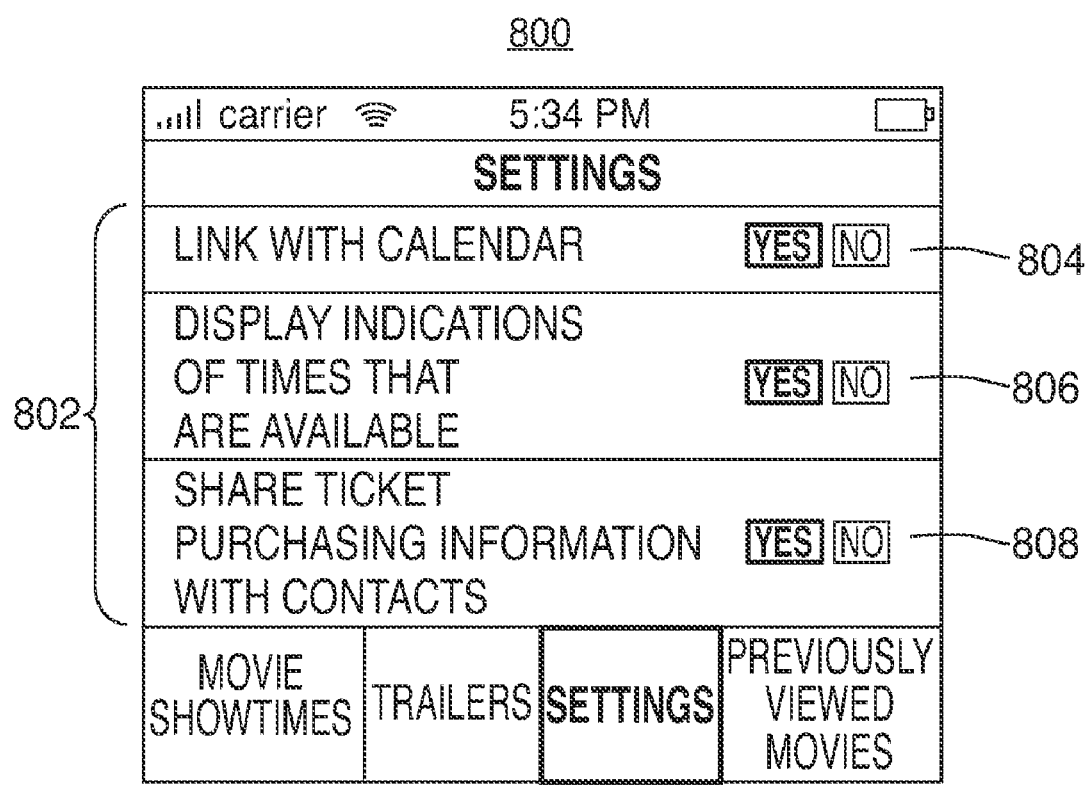
FIG. 8 shows a display screen associated with a "SETTINGS" option of a movie application in accordance with various embodiments of the invention.

For example, FIG. 8 shows a display screen 800 associated with a "SETTINGS" option. Display screen 800 can include a listing of settings 802. Listing of settings 802 can include options 804, 806, and 808, which can modify the settings of one or more features of the movie application. Persons skilled in the art will appreciate that the movie application can provide options different from or additional to the options provided in listing of settings 802.

A user may select option 804 to specify whether to link the movie application with a calendar. The calendar can be, for example, a calendar stored in memory (e.g., memory 104 of FIG. 1) or a calendar stored on an external server. As shown in display screen 800, the current value of option 804 is "YES". Thus, the movie application can automatically obtain one or more calendar events. In response to obtaining the one or more calendar events, the movie application can perform one or more actions. For example, the movie application can adjust one or more times slots displayed in a list of show times (e.g., list of show times 216, 502, and 702 of FIGS. 2, 5, and 7, respectively). As another example, the movie application can arrange movie theaters in a list of movie theaters (e.g., list of movie theaters 302, 402, and 602, of FIGS. 3, 4, and 6, respectively). As yet another example, the movie application can adjust one or more options associated with a list of movie theaters (e.g., adjust an option providing the distance between the user's current location and the location of a listed movie theater).

Option 806 can allow a user to specify whether the movie application can display indications of unavailable time slots and/or show times. For example, in response to the user setting the value of option 806 to "YES", the movie application can provide a list of show times with indications of unavailable time slots and/or show times. For example, when the user selects to view movie show times, the movie application can provide a display screen where slot labels corresponding to unavailable time slots can be crossed out (e.g., as provided in display screen 700 of FIG. 7). Alternatively, in response to the user setting the value of option 806 to "NO", the movie application can provide a list of show times without providing the availabilities of time slots and/or show times. For example, when the user selects to view movie show times, the movie application can provide a display screen similar to display screen 200 of FIG. 2 or display screen 500 of FIG. 5.

A user may select option 808 to specify whether the movie application can share purchasing information with one or more contacts. Thus, if the value of option 808 is set to "YES", the movie application can perform one or more actions in response to the user selecting to purchase a movie ticket. For example, a user may select a "BUY TICKET" option (e.g., "BUY TICKET" option 412 of FIG. 4) to purchase one or more movie tickets for a particular movie. In response to receiving an instruction from the user to purchase one or more movie tickets, the movie application can automatically add information associated with the ticket purchases to a calendar. In some embodiments, in response to receiving the instruction, the movie application can present a display screen associated with a "BUY TICKET" option.

Figure 9:
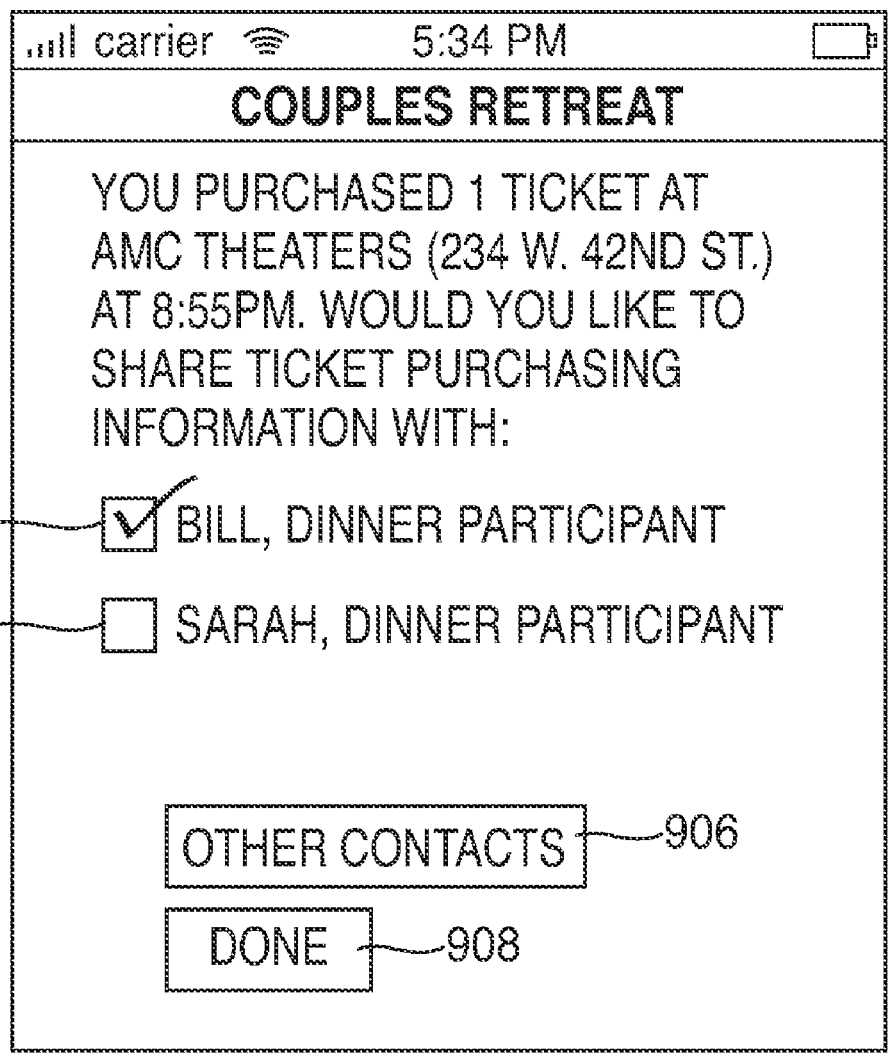
FIG. 9 shows a display screen for transmitting ticket purchasing information of a movie application in accordance with various embodiments of the invention.

For example, FIG. 9 shows a display screen 900 associated with a "BUY TICKET" option for a movie. Display screen 900 can include one or more contact options 902 and 904, which can be automatically generated by the movie application based on one or more factors. For example, if the movie application determines that a calendar event occurs within a pre-determined range of a start time or end time of the movie, the movie application can determine one or more participants of the calendar event. For instance, as shown in display screen 900, the movie application can determine that Bill and Sarah are two other participants for dinner. Thus, the movie application can automatically display contact options 902 and 904 corresponding to these participants. As another example, the user may have previously specified favorite contacts by selecting an "INFORMATION" option (e.g., "INFORMATION" option 208 of FIG. 2). Thus, the movie application can automatically display contact options 902 and 904 that correspond to the user's favorite contacts.

In some embodiments, the user may select each option (e.g., option 902 or option 904) to specify whether to share ticket purchasing information with a contact corresponding to the option. For example, as shown in display screen 900, option 902 is selected. Thus, in response to receiving an instruction to transmit the information associated with the ticket purchase to the contact corresponding to option 902 (e.g., when the user selects "DONE" option 908), the movie application can transmit ticket purchasing information to Bill (e.g., to Bill's electronic device or e-mail account).

In some embodiments, display screen 900 can include "OTHER CONTACTS" option 906 that can allow a user to specify one or more contacts for transmitting ticket purchasing information. Thus, in response to the user selecting "OTHER CONTACTS" option 906, the movie application can display a list of contacts (e.g., a list of contacts that can be stored in memory 104 of FIG. 1), thereby allowing a user to select the one or more contacts. Then, in response to receiving an instruction to transmit the information associated with the ticket purchase to the one or more contacts (e.g., when the user selects "DONE" option 908), the movie application can transmit ticket purchasing information to the one or more selected contacts. Persons skilled in the art will appreciate that the movie application can provide any other suitable option in addition to or instead of the options provided in display screen 900.

In some embodiments, if no contacts or participants are selected in contact options 902 and 904 or "OTHER CONTACTS" option 906, the user may exit display screen 900 without sharing ticket purchasing information. For example, in response to the user selecting "DONE" option 908, the movie application can return to display screen 400 of FIG. 4 without transmitting ticket purchasing information to other devices.

Figure 10:
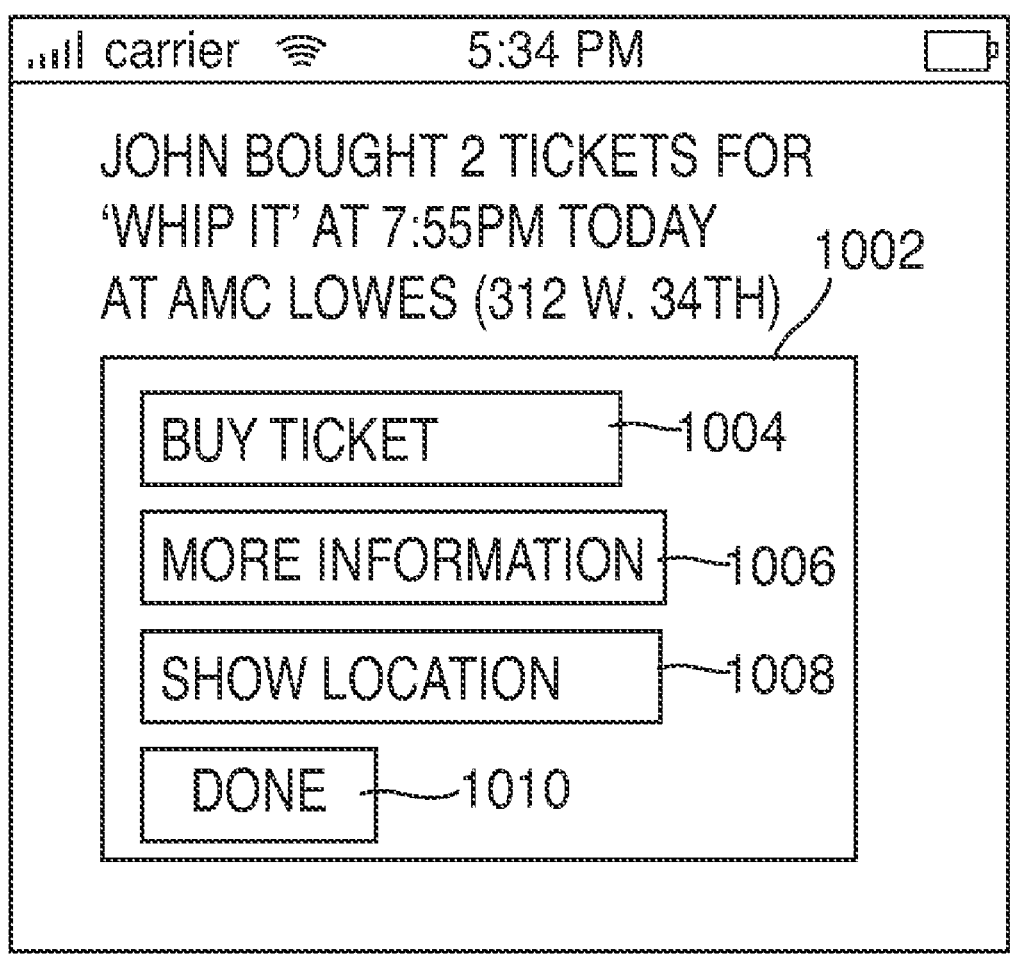
FIG. 10 shows a display screen for providing ticket purchasing information of a movie application in accordance with various embodiments of the invention.

In some embodiments, if the value of option 808 of FIG. 8 is set to "YES", the movie application can receive ticket purchasing information from one or more other electronic devices. For example, FIG. 10 shows a display screen 1000 for providing ticket purchasing information of a movie application, which can be provided by various embodiments of the electronic device. Display screen 1000 can include message 1002, which can provide an indication that a user of another electronic device has purchased one or more movie tickets. Message 1002 can include any suitable information associated with the one or more movie tickets such as, for example, information associated with the movie theater (e.g., name and address of the movie theater), information associated with the purchased movie tickets (e.g., show time), and/or any other suitable information.

In addition, display screen 1000 can include options allowing the user to perform one or more actions. For example, the movie application can provide "BUY TICKET" option 1004 allowing a user to purchase one or more movie tickets for the movie. In some embodiments, in response to the user selecting "BUY TICKET" option 1004, the movie application can provide a display screen similar to display screen 300 of FIG. 3, display screen 400 of FIG. 4, or display screen 600 of FIG. 6. Thus, the user may have the option of purchasing tickets for one or more showings of the movie. In other embodiments, in response to the user selecting "BUY TICKET" option 1004, the movie application can allow a user to purchase tickets for the same showing as the showing provided in display screen 1000.

In some embodiments, display screen 1000 can include "MOVIE INFORMATION" option 1006, which may allow a user to selectively view additional information associated with the movie. For example, in response to the user selecting "MOVIE INFORMATION" option 1006, the movie application can provide detailed information associated with the movie (e.g., rating, trailer, release date, duration, cast, genre, summary, and the like).

In addition, display screen 1000 can include "SHOW LOCATION" option 1008 allowing a user to view the location of the movie theater where the tickets were purchased. For example, in response to the user selecting "SHOW LOCATION" option 1008, the electronic device can launch a map application providing the location of the movie theater.

Display screen 1000 can include option 1010, which can allow the user to exit display screen 1000 without purchasing movie tickets. Thus, in response to the user selecting option 1010, the movie application can remove message 1002 and the one or more options (e.g., options 1004, 1006, 1008, and 1010) from display screen 1000.

Figure 11:
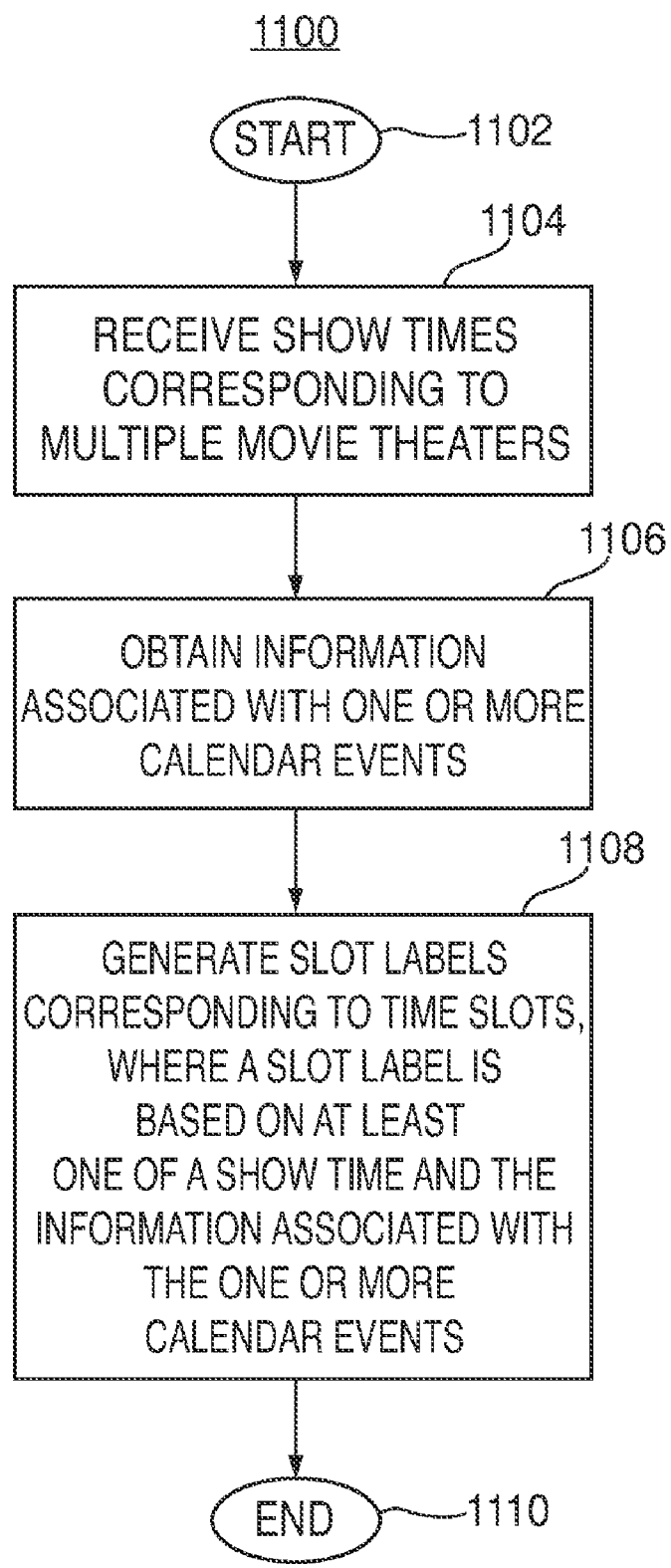
FIG. 11 shows a flowchart of an illustrative process for generating slot labels of time slots in accordance with various embodiments of the invention.
Figure 12A:
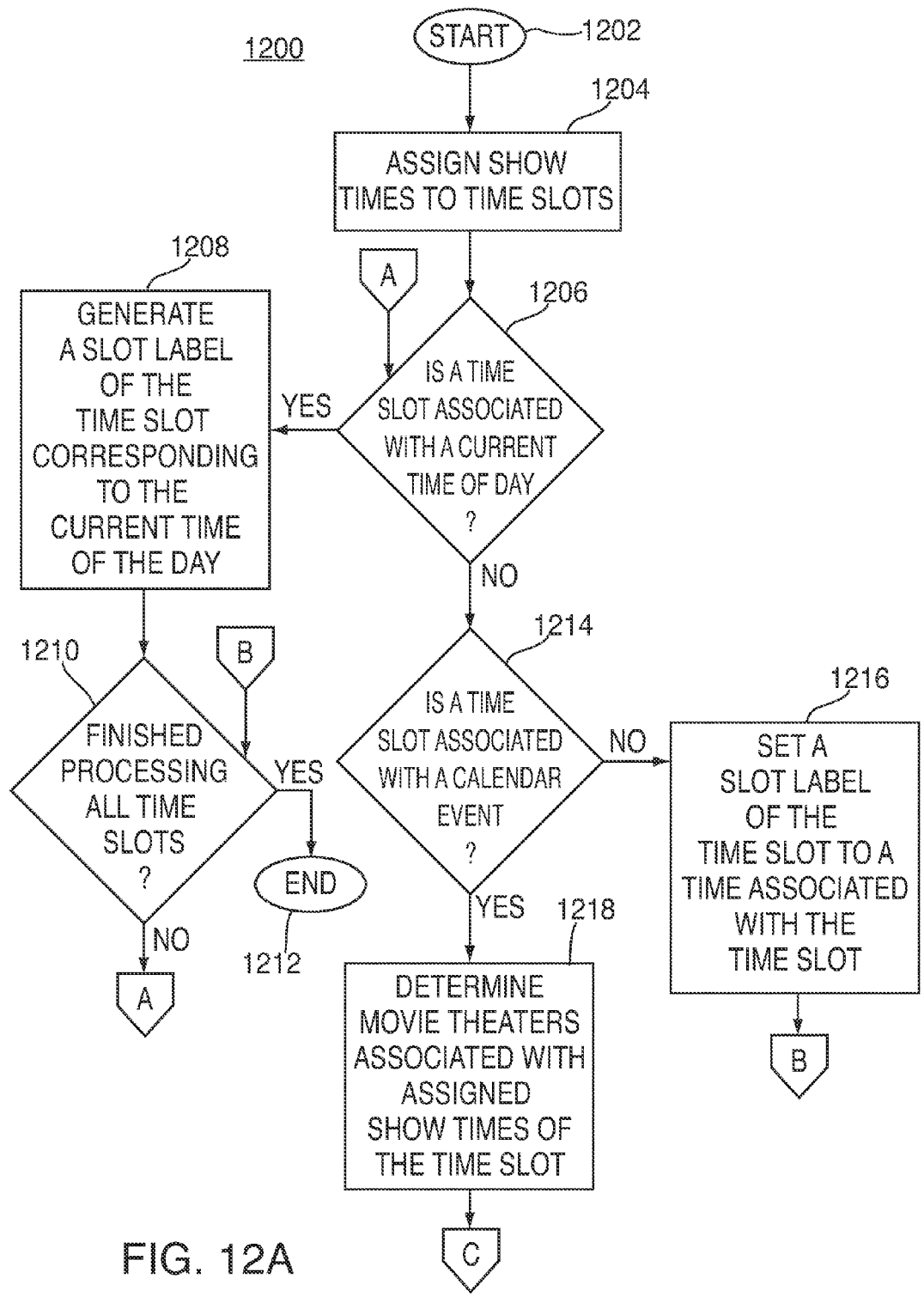
FIGS. 12A and 12B show flowcharts of an illustrative process for selecting slot labels of time slots based on current context in accordance with various embodiments of the invention.
Figure 12B:
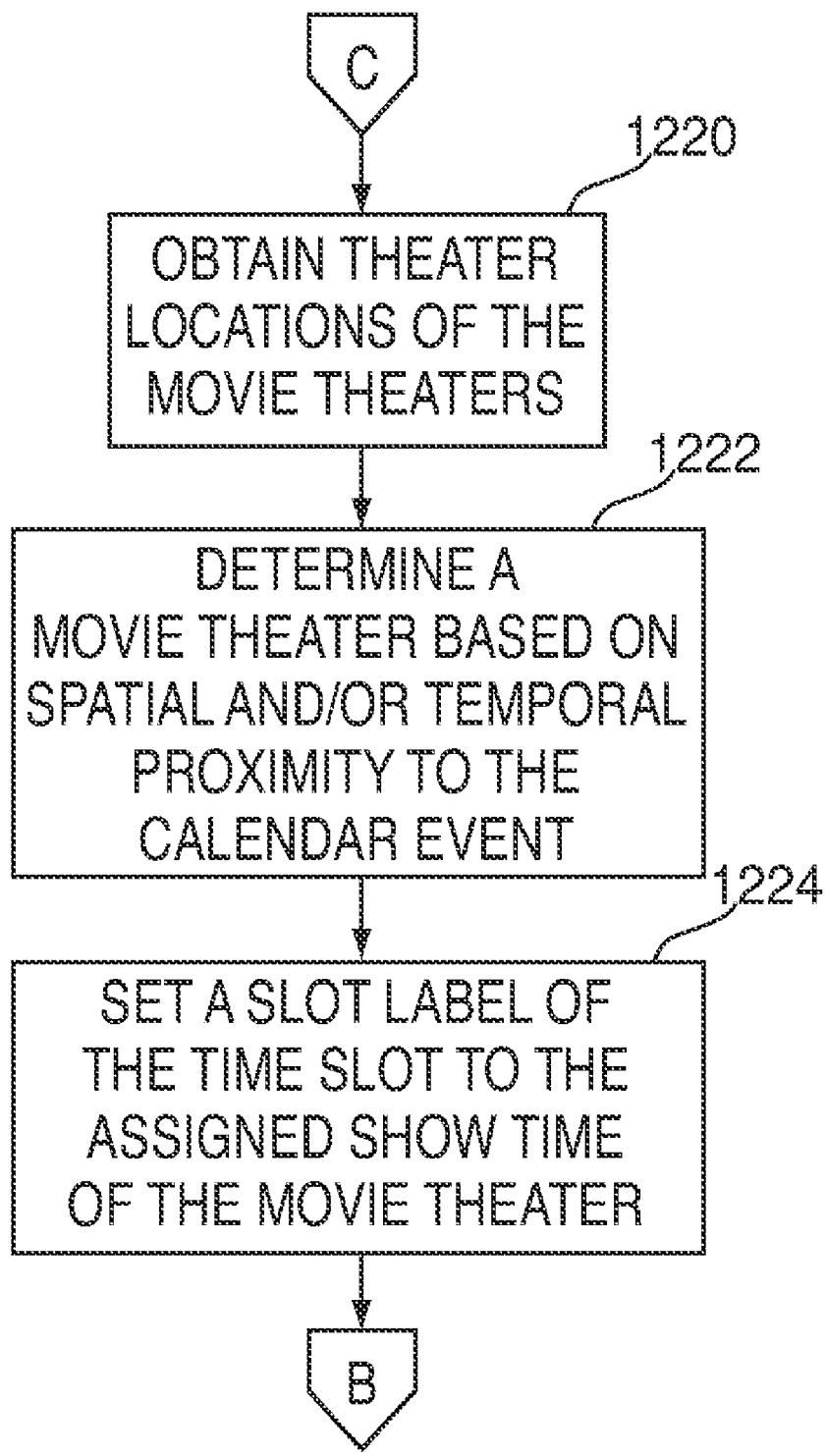

Referring now to FIGS. 11, 12A, and 12B, flowcharts of illustrative processes are shown in accordance with various embodiments of the invention. The processes may be executed by an electronic device, such as electronic device 100 of FIG. 1, or the steps may correspond to machine-readable instructions recorded on machine-readable media (e.g., computer-readable media, memory 104 of FIG. 1, etc.). It should be understood that these processes are merely illustrative. Any of the blocks may be combined, removed, or modified, and any blocks may be added, without departing from the scope of the invention.

Referring first to FIG. 11, a flowchart of illustrative process 1100 is shown for generating slot labels of time slots. Process 1100 may begin at block 1102. Then, at block 1104, the movie application can receive one or more show times corresponding to multiple movie theaters.

At block 1106, the movie application can obtain information associated with one or more calendar events. For example, the movie application can obtain the information from memory (e.g., memory 104 of FIG. 1) and/or a server (e.g., via communications circuitry 110 of FIG. 1). After obtaining the information associated with one or more calendar events, process 1100 may move to block 1108.

At block 1108, the movie application can generate slot labels corresponding to one or more time slots, where a slot label is based on at least one of a show time and the information associated with one or more calendar events. For example, the movie application can first obtain time slots based on a set of time intervals. The movie application can then assign the show times to each time slot. After assigning the show times, the movie application can determine one or more time slots that are associated with the one or more calendar events.

In some embodiments, for each of these time slots, the movie application can determine an assigned show time that is most accessible based on a calendar event. For instance, as discussed in connection with FIG. 2, the movie application can determine the most accessible show time based on spatial proximity, temporal proximity, current traffic conditions, and/or any combination thereof. Finally, the movie application can generate a slot label corresponding to the time slot by setting the slot label to the assigned show time.

In other embodiments, the movie application can generate slot labels corresponding to time intervals of time slots. In further embodiments, the movie application can generate a slot label that includes a description corresponding to a time slot. For example, the description may be associated with one or more assigned show times of the time slot and/or one or more calendar events associated with the time slot. After generating the slot labels, process 1100 may then end at block 1110.

Referring now to FIGS. 12A and 12B, a flowchart of illustrative process 1200 is shown for selecting slot labels of time slots based on current context. In some embodiments, process 1200 may be a more detailed view of generating block 1108 of process 1100 (FIG. 11).

Process 1200 may begin at block 1202. At block 1204, the movie application can assign show times to time slots. Then, at block 1206, the movie application can determine whether a time slot is associated with a current time of day. If, at block 1206, the movie application determines that the time slot is associated with the current time of day, process 1200 may move to block 1208.

At block 1208, the movie application can generate a slot label of the time slot corresponding to the current time of day. For example, the movie application can generate a slot label by setting the slot label to an assigned show time closest to the current time of day. As another example, the movie application can generate a slot label that includes a description corresponding to the current time of day (e.g., "current show times"). After generating the slot label, process 1200 may move to block 1210.

At block 1210, the movie application can determine whether all time slots have been processed. If, at block 1210, the movie application determines that all time slots have been processed, process 1200 may end at block 1212. Otherwise, process 1200 may return to block 1206 where the movie application can process the remaining time slots.

Referring back to block 1206, if the movie application instead determines that the time slot is not associated with the current time of day, process 1200 may move to block 1214. At block 1214, the movie application can determine whether a time slot is associated with a calendar event. For example, the movie application can determine whether a time associated with the time slot is within a pre-determined range of a start time or an end time of a calendar event. The time associated with the time slot can be any suitable time such as, for example, an assigned show time of the time slot, an end time of a movie associated with an assigned show time, a start time of a time interval associated with the time slot, an end time of a time interval associated with the time slot, any other suitable time, and/or any combination thereof. If, at block 1214, the movie application determines that the time slot is not associated with a calendar event, process 1200 may move to block 1216.

At block 1216, the movie application can set a slot label of the time slot to a time associated with the time slot. For example, if a time slot is associated with a particular time interval (e.g., 6:00 pm-7:00 pm), the movie application can set the slot label to a start time of the time interval (e.g., 6:00 pm), an end time of the time interval (e.g., 7:00 pm), any suitable time between the start time and the end time of the time interval (e.g., 6:30 pm), or the time interval itself (e.g., 6:00 pm-7:00 pm). After setting the slot label, process 1200 may move to block 1210, as discussed previously.

Referring back to block 1214, if the movie application instead determines that the time slot is associated with a calendar event, process 1200 may move to block 1218.

At block 1218, the movie application can determine movie theaters associated with assigned show times of the time slot. Then, at block 1220, the movie application can obtain theater locations of the movie theaters. After obtaining the theater locations, process 1200 may move to block 1222.

At block 1222, the movie application can determine a movie theater based on spatial and/or temporal proximity to the calendar event. For example, the movie application can determine a movie theater with a theater location that is closest to the location of the calendar event. As another example, in addition to or instead of using spatial proximity to determine the most suitable slot label, the movie application can determine a movie theater with an assigned show time (or a corresponding end time) that is closest to a start time or an end time of a calendar event.

Continuing to step 1224, the movie application can set a slot label of the time slot to the assigned show time of the movie theater. Process 1200 may then move back to block 1210, as discussed previously.

The described embodiments of the invention are presented for the purpose of illustration and not of limitation.

What is claimed is:

1. A method for generating show times of a movie, the method comprising:
   receiving, by control circuitry of an electronic device, a plurality of show times of the movie associated with a plurality of movie theaters;
   obtaining, by communications circuitry of the electronic device, information associated with at least one calendar event;
   assigning, by the control circuitry, each show time of the plurality of show times to an associated time slot of a plurality of time slots, wherein a first show time of the plurality of show times that is associated with a first movie theater of the plurality of movie theaters and a second show time of the plurality of show times that is associated with a second movie theater of the plurality of movie theaters are assigned to a first time slot of the plurality of time slots; and
   generating, by the control circuitry, a plurality of slot labels, wherein each slot label corresponds to one of the plurality of time slots, and wherein the generating comprises:
   defining, by the control circuitry, a first slot label of the plurality of slot labels for the first time slot based on the first show time and the second show time; and
   providing, by the control circuitry, an indication for the first time slot based on the information associated with the at least one calendar event.

2. The method of claim 1, wherein the information associated with the at least one calendar event comprises at least one of an event start time, an event end time, an event time period, and an event location.

3. The method of claim 1, further comprising:
   determining, by the control circuitry, if at least one portion of a time period associated with the first time slot overlaps with a time period of the at least one calendar event; and
   in response to determining that the at least one portion of the time period associated with the first time slot overlaps, displaying, by a display of the electronic device, the indication.

4. The method of claim 2, further comprising:
   determining, by the control circuitry, that a particular time slot of the plurality of time slots is associated with only one assigned show time; and
   setting, by the control circuitry, a second slot label of the particular time slot to be the assigned show time.

5. The method of claim 2, further comprising:
   determining, by the control circuitry, that a particular time slot of the plurality of time slots is associated with at least two assigned show times of the plurality of show times;
   determining, by the control circuitry, if the particular time slot is associated with the at least one calendar event; and
   in response to determining that the particular time slot is associated with the at least one calendar event, setting, by the control circuitry, a second slot label of the particular time slot to be one of the at least two assigned show times.

6. The method of claim 5, wherein the determining if the particular time slot is associated with the at least one calendar event further comprises determining if a time associated with the particular time slot is within a pre-determined range of at least one of the event start time and the event end time of the at least one calendar event.

7. The method of claim 6, wherein the time associated with the particular time slot is an assigned show time of the at least two assigned show times.

8. The method of claim 6, wherein the time associated with the particular time slot is an end time associated with an assigned show time of the at least two assigned show times.

9. The method of claim 5, wherein the setting the second slot label further comprises:
- determining at least two movie theaters of the plurality of movie theaters associated with the at least two assigned show times;
- obtaining theater locations of the at least two movie theaters;
- determining a theater location of the obtained theater locations that is closest to the event location of the at least one calendar event; and
- setting the second slot label to one of the at least two assigned show times of the movie theater corresponding to the determined theater location.

10. The method of claim 1, wherein the defining the first slot label for the first time slot based on the first show time and the second show time comprises:
- determining, by the control circuitry, a current time of day;
- determining, by the control circuitry, the one of the first show time and the second show time that is closest to the current time of day; and
- setting, by the control circuitry, the first slot label to the one of the first show time and the second show time that is closest to the current time of day.

11. The method of claim 1, wherein the defining the first slot label for the first time slot based on the first show time and the second show time comprises:
- determining, by the control circuitry, a current location of the electronic device;
- determining, by the control circuitry, the one of the first movie theater location and the second movie theater that is closest to the current location of the electronic device; and
- setting, by the control circuitry, the first slot label to the one of the first show time and the second show time corresponding to the one of the first movie theater and the second movie theater that is closest to the current location of the electronic device.

12. A non-transitory machine-readable media for generating movie show times, the machine-readable media comprising machine-readable instructions recorded thereon for:
- receiving a plurality of show times associated with a plurality of movie theaters;
- obtaining information associated with at least one calendar event;
- assigning each show time of the plurality of show times to an associated time slot of a plurality of time slots, wherein a first show time of the plurality of show times that is associated with a first movie theater of the plurality of movie theaters and a second show time of the plurality of show times that is associated with a second movie theater of the plurality of movie theaters are assigned to a first time slot of the plurality of time slots; and
- generating a plurality of slot labels, wherein each slot label of the plurality of slot labels corresponds to one of the plurality of time slots, and wherein the generating comprises:
  - defining a first slot label of the plurality of slot labels for the first time slot based on the first show time and the second show time; and
  - providing an indication for the first time slot based on the information associated with the at least one calendar event.

13. The non-transitory machine-readable media of claim 12, wherein the information associated with the at least one calendar event comprises at least one of an event start time, an event end time, an event time period, and an event location.

14. The non-transitory machine-readable media of claim 13, the machine-readable media further comprising machine-readable instructions recorded thereon for:
- determining if at least one portion of a time period associated with the first time slot overlaps with a time period of the at least one calendar event; and
- in response to determining that the at least one portion of the time period associated with the first time slot overlaps, displaying the indication.

* * * * *

UNITED STATES PATENT AND TRADEMARK OFFICE
CERTIFICATE OF CORRECTION

PATENT NO. : 8,260,640 B2
APPLICATION NO. : 12/631437
DATED : September 4, 2012
INVENTOR(S) : John Louch et al.

Page 1 of 1

It is certified that error appears in the above-identified patent and that said Letters Patent is hereby corrected as shown below:

In the Claims:

Column 20, line 35, please delete "claim 1" and insert --claim 2--.

Signed and Sealed this
Thirtieth Day of April, 2013

Teresa Stanek Rea
*Acting Director of the United States Patent and Trademark Office*